(12) United States Patent
Frans et al.

(10) Patent No.: US 9,330,034 B2
(45) Date of Patent: May 3, 2016

(54) LEVELIZATION OF MEMORY INTERFACE FOR COMMUNICATING WITH MULTIPLE MEMORY DEVICES

(75) Inventors: Yohan Usthavia Frans, Sunnyvale, CA (US); Simon Li, Cupertino, CA (US)

(73) Assignee: Rambus Inc., Sunnyvale, CA (US)

( * ) Notice: Subject to any disclaimer, the term of this patent is extended or adjusted under 35 U.S.C. 154(b) by 398 days.

(21) Appl. No.: 13/582,043

(22) PCT Filed: Mar. 30, 2011

(86) PCT No.: PCT/US2011/030574
§ 371 (c)(1),
(2), (4) Date: Aug. 30, 2012

(87) PCT Pub. No.: WO2011/130007
PCT Pub. Date: Oct. 20, 2011

(65) Prior Publication Data
US 2013/0013878 A1    Jan. 10, 2013

Related U.S. Application Data

(60) Provisional application No. 61/324,046, filed on Apr. 14, 2010.

(51) Int. Cl.
*G06F 13/00* (2006.01)
*G06F 13/16* (2006.01)

(52) U.S. Cl.
CPC ........ *G06F 13/1689* (2013.01); *G06F 13/1684* (2013.01)

(58) Field of Classification Search
None
See application file for complete search history.

(56) References Cited

U.S. PATENT DOCUMENTS

| | | | |
|---|---|---|---|
| 5,892,981 A * | 4/1999 | Wiggers | 710/58 |
| 5,953,284 A | 9/1999 | Baker et al. | |
| 6,026,050 A | 2/2000 | Baker et al. | |
| 2002/0147898 A1* | 10/2002 | Rentschler et al. | 711/170 |
| 2008/0104352 A1 | 5/2008 | Talbot | |

FOREIGN PATENT DOCUMENTS

WO    WO 98/15897 A1    4/1998

OTHER PUBLICATIONS

PCT International Search Report and Written Opinion, PCT/US2011/030574, Jun. 20, 2011, 9 Pages.

* cited by examiner

*Primary Examiner* — Kevin Verbrugge
*Assistant Examiner* — Craig Goldschmidt
(74) *Attorney, Agent, or Firm* — Fenwick & West LLP

(57) ABSTRACT

In a memory system in which a system clock signal is forwarded from the memory controller to multiple memory devices, the phase of the system clock signal forwarded to the slower memory device is advanced relative to the system clock signal forwarded to the faster memory device by a phase corresponding to the skew on the data links corresponding to the memory devices. This causes the state machine of the slower memory device to change states and advance earlier than the state machine in the faster memory device, and as a result, the data read from both the slower memory device and the faster memory device are unskewed on the data links between the memory controller and the memory devices.

28 Claims, 6 Drawing Sheets

LEVELIZATION OF MEMORY INTERFACE FOR COMMUNICATING WITH MULTIPLE MEMORY DEVICES

BACKGROUND

The present disclosure relates to levelization of memory interfaces for communicating with multiple memory devices.

Memory controllers generate command and address signals to write data to memory devices and read data from memory devices. In order to synchronize timings at which the command and address signals are received by the memory devices and the timings at which the data is written to or read from the memory devices between the memory controller and the memory devices, a system clock signal is typically used. The memory devices have various state machines and logic circuitries for processing the command and address signals and writing or reading data to or from the memory cells and communicating data and such command and address signals with the memory controller. Such state machines and logic circuitries operate clocked according to the system clock signal.

In some memory devices, the clock signal used by the memory controller is recovered in the memory devices so that the memory controller and the memory devices may be synchronized in timing when writing data to the memory devices or reading data from the memory devices. In some other memory devices, the memory controller is designed to forward the system clock signal it uses to the memory devices so that the memory devices can be synchronized to the same system clock signal when writing or reading data and transmitting the read data to the memory controller.

Generally, memory controllers are designed to interface with multiple memory devices to control memory access and write data to the memory devices or read data from the memory devices. When the memory controller forwards the system clock signal to multiple memory devices, the system clock signal is typically not propagated with the same delay within the multiple memory devices, because process variations during the fabrication process of each of the memory device integrated circuits (ICs) cause the various electronic components in the memory devices to have different delay in propagating the system clock signal. Since the state machines and various logic circuitries in the memory devices operate synchronized with the clock signal, the multiple memory devices may not read data and transmit the read data to the memory controller synchronized at the same timing, causing skew in the read memory data on the multiple lanes for communicating with the multiple memory devices.

In high speed memory interfaces having multiple data lanes, each lane in the memory PHY serializes parallel data (8-bit data for example) from the memory core into serial bit streams (3.2 Gbps, for example) and sends the serial bit steams to the corresponding lane in the memory controller. Each lane in the memory controller PHY uses its parallel clock (400 MHz, for example) to deserialize the bit streams back into 8-bit parallel data and to send the 8-bit parallel data to the memory controller core. The phase of the parallel clock determines 8-bit boundaries of the bit streams—correct phase is necessary to frame the bit-streams into the original 8-bit data from the memory core. The phase of the parallel clock is also constrained by its relationship to the memory controller core parallel clock. Because the memory controller core parallel clock is common for all lanes and the phase of parallel clocks in the memory controller PHY vary from lane to lane depending on the timing of its bit streams, the lane-to-lane skew of the bit streams needs to be controlled. Thus, conventional techniques for deskewing data on the multiple interfaces have been developed. For small lane-to-lane skew, the skewed data can be re-synchronized at the memory controller simply by having a synchronization latch. On the other hand, in a high speed serial memory interface that operates at a high clock frequency, the lane-to-lane clock skew due to process variation in the memory devices may be large, for example, as large as 4 UIs (unit intervals) for a clock that runs at 2.15 GHz to support 4.3 Gbps data rate in a double-data-rate (DDR) signaling.

BRIEF DESCRIPTION OF THE DRAWINGS

The teachings of the embodiments herein can be readily understood by considering the following detailed description in conjunction with the accompanying drawings.

DETAILED DESCRIPTION OF EMBODIMENTS

Embodiments of the present disclosure include a memory system in which a system clock signal is forwarded from the memory controller to multiple memory devices, with the phase of the system clock signal forwarded to the slower memory device being advanced by a phase amount corresponding to the skew on the data links corresponding to the multiple memory devices. This causes the state machine of the slower memory device to change states earlier than it would if the phase of the system clock signal were not advanced, and as a result, the data read from the slower memory device and the faster memory device are unskewed on the data links between the memory controller and the multiple memory devices.

Reference will now be made to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the disclosure described herein.

Figure 1A:
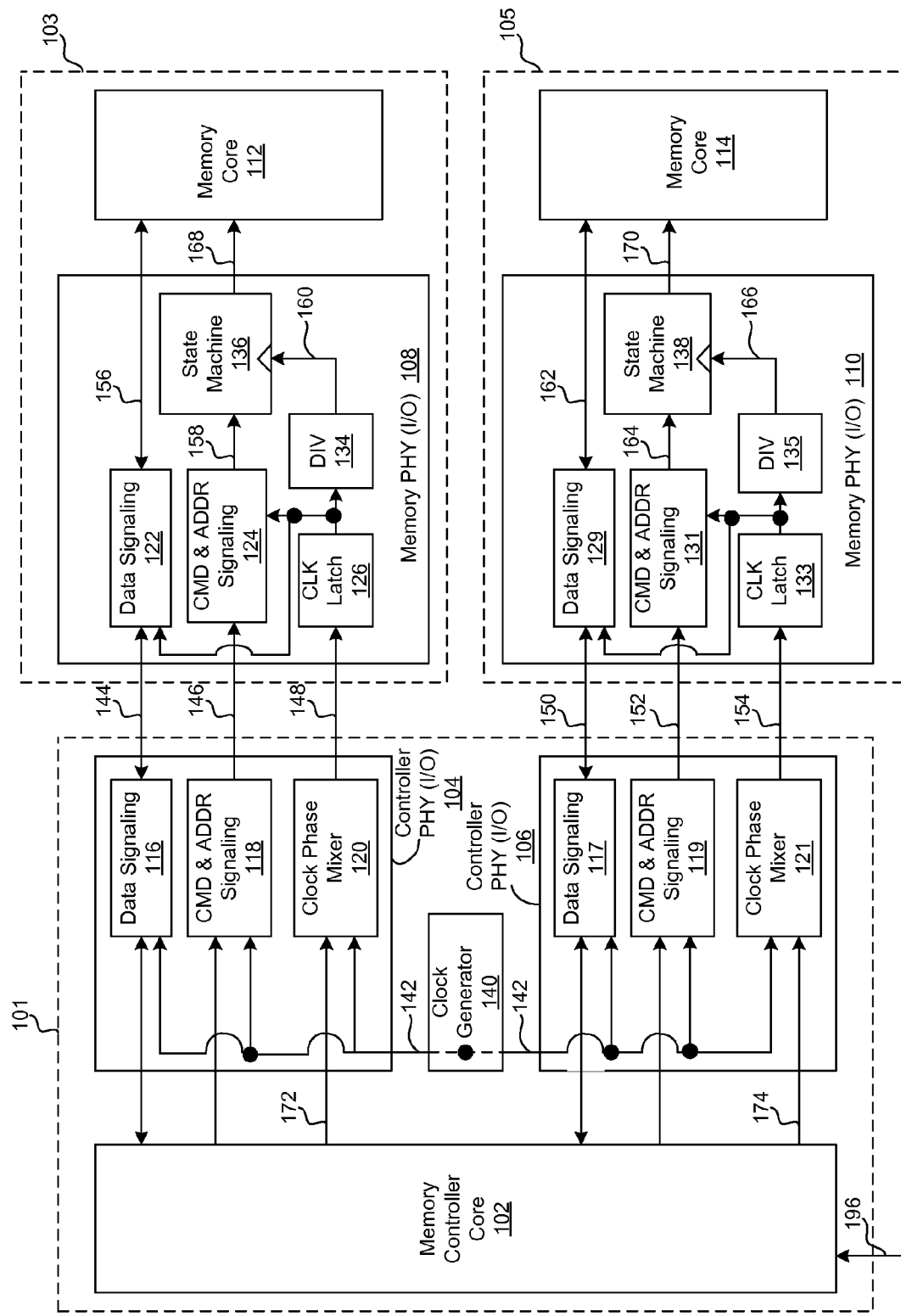
FIG. 1A illustrates a memory system that deskews the memory interface between a memory controller and multiple memory devices, according to one embodiment.

FIG. 1A illustrates a memory system that deskews the memory interface between a memory controller and multiple memory devices, according to one embodiment. The memory system includes a memory controller 101 and multiple memory devices 103, 105 coupled to the memory controller 101 via signaling links 144, 146, 150, 152, and system clock links 148, 154. Although FIG. 1A shows only two memory devices controlled by memory controller 101, this is merely exemplary and in real memory systems there may be more than two memory devices controlled by a single memory controller. Memory controller 101 itself includes a memory controller core 102 and controller input/output interface circuits 104, 106 (or PHYs; physical interfaces). Memory device 103 includes a memory core 112 and a memory I/O interface 108 (PHY), and memory device 105 includes a memory core 114 and memory PHY 110. The PHYs (I/O interfaces) within the memory devices 103, 105 and the memory controller 101 include signaling circuitry (122, 124, 129, 131, 116, 118, 117, 119) to support bi-directional transfer of data and unidirectional transfer of commands (or requests or instructions) and addresses (C/A). Specifically, controller PHY 104 includes data signaling circuitry 116 and memory PHY 108 includes data signaling circuitry 122 to bi-directionally transmit data on data link 144. Controller PHY 104 includes command/address (CMD & ADDR) signaling circuitry 118 and memory PHY 108 includes command/address signaling circuitry 124 to uni-directionally transmit command and address signals from memory controller 101 to memory device 103 on CMD/ADDR signal link 146. Similarly, controller PHY 106 includes data signaling circuitry 117 and memory PHY 110 includes data signaling circuitry 129 to bi-directionally transmit data on data link 150. Controller PHY 106 includes command/address (CMD & ADDR) signaling circuitry 119 and memory PHY 110 includes command/address signaling circuitry 131 to uni-directionally transmit command and address signals from memory controller 101 to memory device 105 on CMD/ADDR signal link 152.

Memory controller 101 also includes a clock generator 140 that generates a system clock signal 142 to be used by memory controller 101 and the memory devices 103, 105. System clock 142 is fed into controller side signaling circuits 116, 118, 117, 119 for use in transmitting data and CMD/ADDR signals to memory devices 103, 105. As will be explained in more detail below, clock phase mixer 120 in controller PHY 104 adjusts the phase of system clock signal 142 according to clock adjustment signal 172 from memory controller core 102, and forwards the phase-adjusted system clock signal 148 to memory device 103, which is then distributed to memory side signaling circuits 122, 124 via clock latch 126 in memory PHY 108. Similarly, clock phase mixer 121 in controller PHY 106 adjusts the phase of system clock signal 142 according to clock adjustment signal 174 from memory controller core 102, and forwards the phase-adjusted system clock signal 154 to memory device 105, which is then distributed to memory side signaling circuits 129, 131 via clock latch 133 in memory PHY 110.

Referring to the memory device 103, memory core 112 may include a memory array of dynamic random access memory (DRAM), static random access memory (SRAM), or non-volatile memory such as flash memory. The forwarded clock signal 148 is output from clock latch 126 and divided down (e.g., by 4) by clock divider 134 to reduce the frequency of the forwarded system clock signal 148 for use in memory device 103. The divided system clock signal 160 is input to state machine 136 that controls the various logic states of memory device 103. The command and address signals 158 received over link 146 are input to state machine 136. State machine 136 provide control signals 168 to memory core 112 to carry out data retrieval (memory read) and data storage (memory write) operations within address-specified regions of the memory core 112. The read data 156 is returned to the memory controller 101 via the data link 144 and the data 156 to be stored is also provided from memory controller 101 to memory core 112 via data link 144.

Similarly, referring to the memory device 105, memory core 114 may also include a memory array of dynamic random access memory (DRAM), static random access memory (SRAM), or non-volatile memory such as flash memory. The forwarded clock signal 154 is output from clock latch 133 and divided down (e.g., by 4) by clock divider 135 to reduce the frequency of the forwarded system clock signal 154 for use in memory device 105. The divided system clock signal 166 is input to state machine 138 that controls the various logic states of memory device 105. The command and address signals 164 received over link 152 are input to state machine 138. State machine 138 provide control signals 170 to memory core 114 to carry out data retrieval (memory read) and data storage (memory write) operations within address-specified regions of the memory core 114. The read data 162 is returned to the memory controller 101 via the data link 150 and data 162 to be stored is also provided from memory controller 101 to memory core 114 via data link 150.

Memory devices 103, 105 are typically separate ICs, which would have been fabricated separately under different process conditions. Because of the process variations during fabrication of the ICs of the memory device 103, 105, the delays in propagating the forwarded system clock signals 148, 154 and the divided clock signals 160, 166 in memory devices 103, 105 may be different. As a result, state machines 136, 138 may operate at different, skewed timings due to skewed clocking by the divided system clock signals 160, 166, despite the memory devices 103, 105 receiving the forwarded system clock signals 148, 154 substantially simultaneously, unskewed. Thus, data may be read from memory cores 112, 114 at different timings and transmitted back to memory controller 101 on links 144, 150 skewed. As explained above, substantial lane-to-lane skew on the data links 144, 150 is problematic, making it difficult to deskew the read data signals for proper operation of the memory system.

Memory controller 101 removes such lane-to-lane skew on data links 144, 150 by advancing the phase of the system clock signal 142 to be transmitted to the "slower memory device", i.e., the memory device with slower clock signal propagation within the memory device IC, by the amount of lane-to-lane skew in the data links 144, 150. Specifically, during byte boundary framing of the memory system, memory controller core 102 determines the extent of the skew in the data links 144, 150 that exist when the system clock signals 142 are transmitted to memory devices 103, 105 simultaneously without any adjustment of phase. There are many conventional methods of determining multi-UI skew on the data links 144, 150, for example, by setting memory PHY 108, 110 to send known bit sequence on all lanes 144, 150 and setting the memory controller PHY 104, 106 to capture the bit sequence on each lane and compare the timing of bit sequence on each lane against a reference bit sequence. Memory controller core 102 may use any one of the conventional methods of determining multi-UI skew in the data received on data links 144, 150 to determine the extent of skew in the data links 144, 150 that exist when the system clock signal 142 is forwarded to the memory devices 103, 105 substantially simultaneously without any phase adjustment. In one embodiment, the extent of the skew is determined in terms of integer multiples of a UI (i.e., N×UI), where a UI (unit interval) herein refers to the time period during which a symbol or bit of data is transmitted.

Once the extent of multi-UI skew is determined, memory controller core 102 generates clock adjustment signal 172 or 174 that indicates which forwarded system clock signal and how much of the phase of the system clock signal 142 should be advanced. For example, if memory device 105 is determined to be the slower memory device, memory controller core 102 generates clock adjustment signal 174 to clock phase mixer 121 to advance the phase of system clock signal 142 by the amount of skew determined to exist in the data signal lanes 144, 150. As a result, the phase of divided clock signal 166 is also advanced by the amount of determined skew in the data lanes 144, 150, and thus the state machine 138 advances through its various logic states earlier than it would have if the phase of the forwarded clock signal 154 were not advanced. This causes the data to be read from memory core 114 and transmitted on data link 150 substantially simultaneously with the data read from memory core 112 and transmitted on data link 144, thereby eliminating skew on the data lanes 144, 150.

Figure 2:
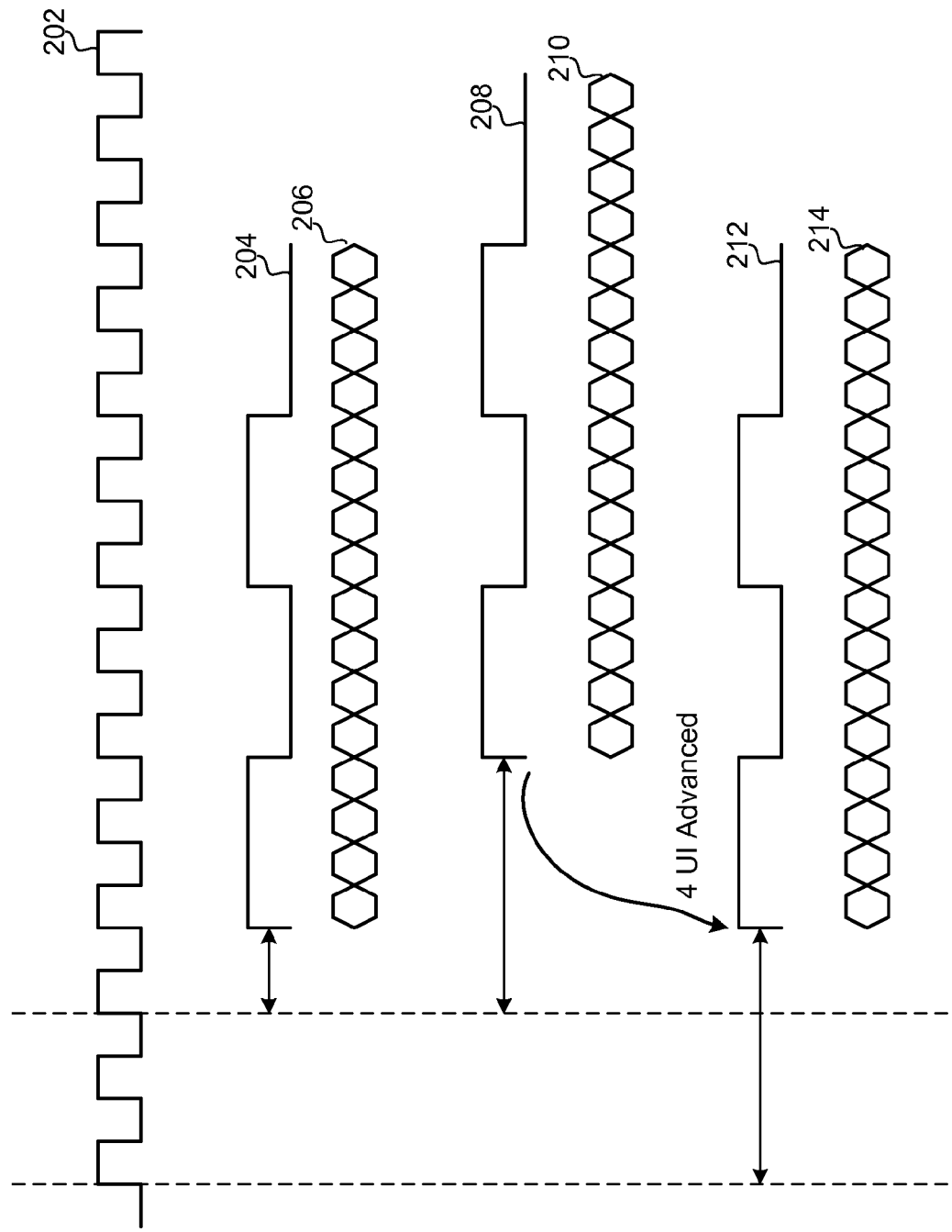
FIG. 2 is a timing diagram illustrating how a clock signal forwarded to a slower memory device is advanced to deskew the memory interface, according to one embodiment.

For example, FIG. 2 is a timing diagram illustrating how a system clock signal forwarded to the slower memory device is advanced to deskew the memory interface, according to one embodiment. For example, memory devices 103, 105 herein are assumed to be double data rate (DDR) RAMs in which data are read at a rate double the frequency of the system clock signal. Thus, the system clock signal 202 is a half-rate system clock. Clock signal 202 is forwarded from memory controller 101 to memory devices 103, 105 via clock channels 148, 154 respectively. Clock 204 is the divided clock 160 that is provided to state machine 136 of memory device 103, and clock 208 is the divided clock 166 that is provided to state machine 138 of memory device 105. Signal 206 represents the data read from memory device 103 synchronized with the divided clock signal 204/160. Signal 210 represents the data read from memory device 105 synchronized with the divided clock signal 208/166. Data 206, 210 are read at a rate double the frequency of the system clock signal 202. In this example, memory device 105 has slower propagation of the clock signal 202, thus causing the divided clock signal 208/166 in memory device 105 to lag in phase by 4 UIs compared to the divided clock signal 204/106 of memory device 103. As a result, the data 210 read from memory device 105 also lags data 206 read from memory device 103 by 4 UIs, causing skew in the data lanes 144, 150.

Memory controller core 102 generates clock phase adjustment signal 174 to advance the system clock 202 provided to memory device 105 by 4 UIs relative to the system clock provided to memory device 103. As a result, the divided clock signal 212 also becomes advanced by 4 UIs, and the data 214 read from the slower memory device 105 becomes aligned with the data 206 read from the faster memory device 103 despite having slower clock signal propagation in the slower memory device 105.

Figure 1B:
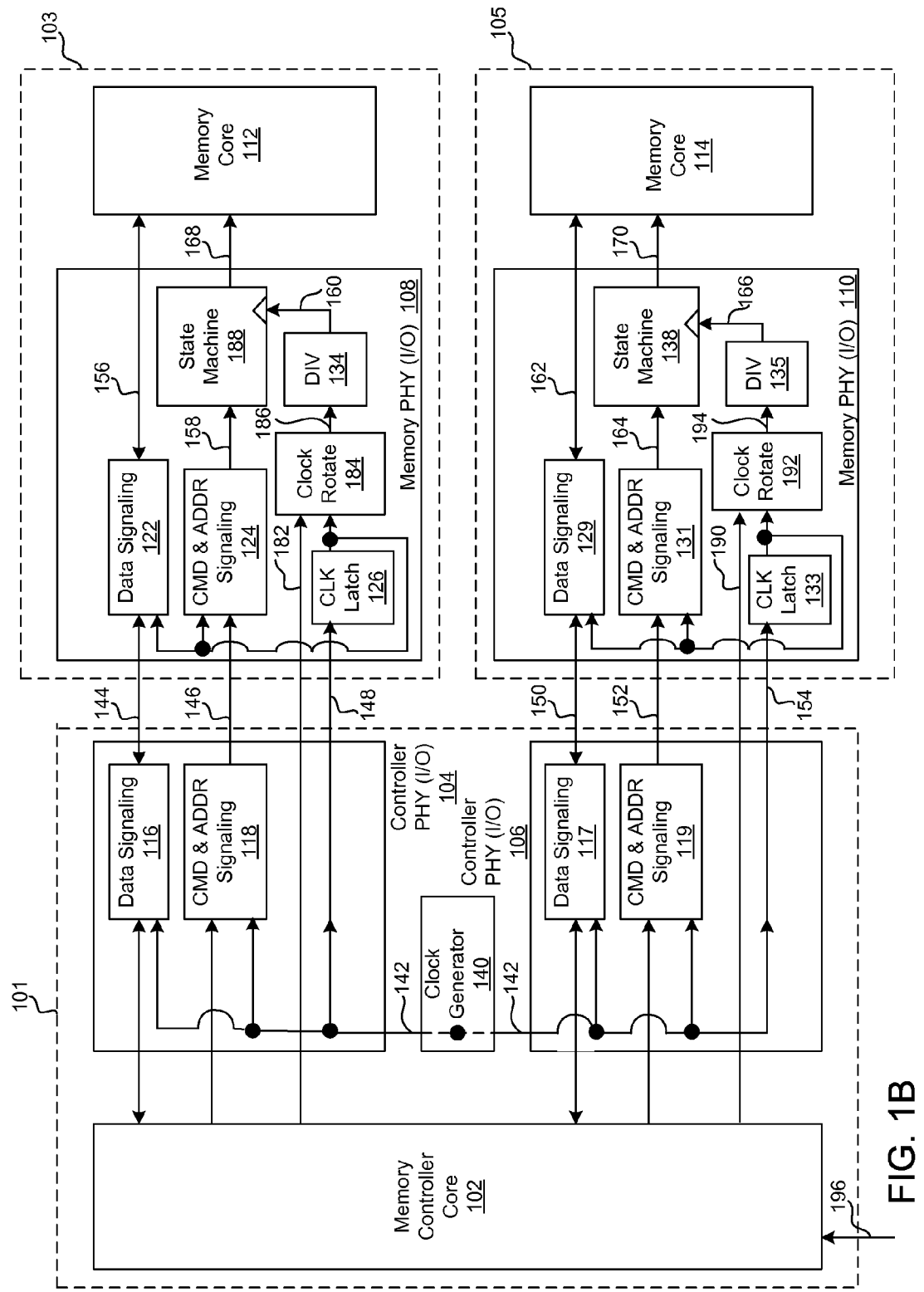
FIG. 1B illustrates a memory system that deskews the memory interface between a memory controller and multiple memory devices, according to another embodiment.

FIG. 1B illustrates a memory system that deskews the memory interface between a memory controller and multiple memory devices, according to another embodiment. The embodiment shown in FIG. 1B is similar to the embodiment shown in FIG. 1A, except that the memory controller 101 does not have phase mixer circuitry in the controller PHYs 104, 106 to advance the phase of the system clock signals forwarded to the memory devices 103, 105. Rather, memory controller core 102 forwards the system clock signals 148, 154 without any phase adjustment, but also transmits the clock phase adjustment signals 182, 190 to clock rotation circuits 184, 192, respectively, of memory devices 103, 105, respectively. Memory device 103 includes clock rotation circuit 184 between clock latch 126 and clock divider 134. Memory device 105 includes clock rotation circuit 192 between clock latch 133 and clock divider 135. Clock rotation circuit 184 adjusts the phase of the forwarded system clock signal 148 according to the clock phase adjustment signal 182 forwarded from memory controller core 102. Clock rotation circuit 192 adjusts the phase of the forwarded system clock signal 154 according to the clock phase adjustment signal 190. The amount of phase adjustment of the forwarded system clock signal is done similarly to the embodiment of FIG. 1A, based on the determined amount of multi-UI skew on the data lanes 144, 150.

Figure 3A:
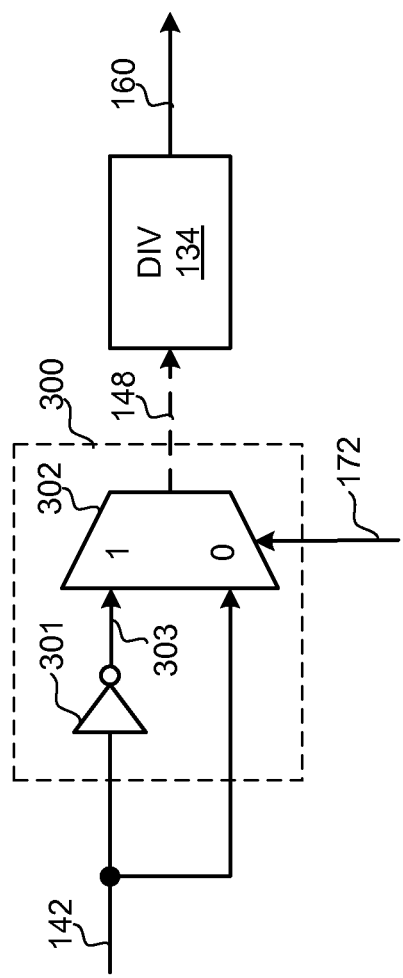
FIG. 3A illustrates a clock rotation circuit for advancing the phase of a clock signal, according to one embodiment.

FIG. 3A illustrates a clock rotation circuit 300 for advancing the phase of a clock signal, according to one embodiment. The clock rotation circuit 300 may be the clock rotation circuit 184 that is included between clock latch 126 and clock divider 134 of memory device 103 (as shown), or the clock rotation circuit 192 that is included between clock latch 133 and clock divider 135 of memory device 105 (as shown). Alternatively, the clock rotation circuit 300 may be included in the clock phase mixer 120, 121 in controller PHY 104, 106. The clock rotation circuit 300 includes an inverter 301 and a multiplexer 302. Multiplexer 302 selects either the system clock signal 142 or the inverted system clock signal 303 according to the clock phase adjustment signal 172 to generate the phase adjusted system clock signal 148. The system clock signal 142 is first paused. Every time the clock phase adjustment signal 172 is toggled when system clock signal 142 is paused, multiplexer 302 changes its input selection either from system clock signal 142 to the inverted system clock signal 303 or vice versa, thereby generating extra edges in the phase adjusted system clock signal 148, which is then input to clock divider 134 to generate the divided clock signal 160.

Figure 3B:
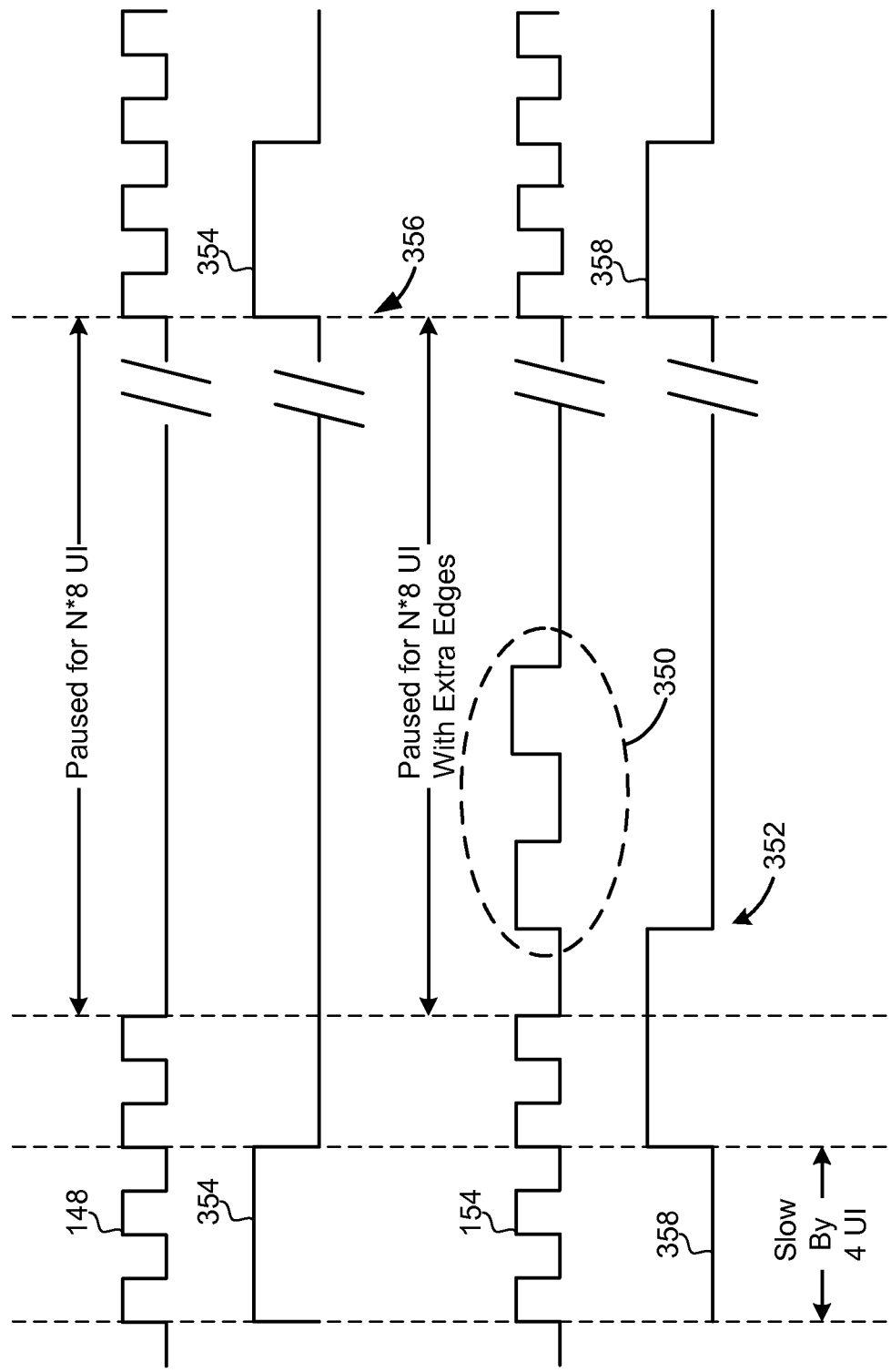
FIG. 3B is a timing diagram illustrating how a clock signal forwarded to a slower memory device is advanced relative to another clock signal forwarded to a faster memory device by pausing both clock signals and generating extra edges in the clock signal forwarded to the slower memory device, according to one embodiment.

The clock rotation circuit in FIG. 3A may be used to advance the phase of the system clock signal forwarded to the slower memory device. FIG. 3B is a timing diagram illustrating how a clock signal forwarded to the slower memory device is advanced relative to another clock signal forwarded to the faster memory devices by pausing both clock signals and generating extra edges in the clock signal forwarded to the slower memory device, according to one embodiment. Referring to FIG. 3B, system clock 148 provided to the faster memory device 103 is divided to generate the divided clock signal 354, and system clock signal 154 provided to the slower memory device 105 is divided to generate the divided clock signal 358. The example of FIG. 3B shows that the divided clock signal 358 in the slower memory device 105 lags divided clock signal 354 in the faster memory device 103 in phase by 4 UIs due to difference in propagation delay of the system clock signals in the memory devices 103, 105. In this example, the ratio between the system clock frequency and the divided clock frequency is 4. Since the clock dividers are periodic state machines with period=8*UI, the clock dividers maintains their state if their input clocks are paused for a duration of N*8 UIs where N is an integer number. In order to correct the skew in the divided clock signals 354, 358 and the resulting data read from the memory devices 103, 105, the system clock 148 provided to the faster memory device 103 is paused for N*8 UIs. In the meantime, the system clock signals 148, 154 provided to the slower memory device 105 are also paused for the same number of UIs (e.g., N*8 UIs) and extra edges 350 are generated in the system clock signal 154 to be provided to the slower memory device 105 during the pause. Clock phase adjustment signals 174 may be toggled one or more times to generate the extra phases 350 using the clock rotation circuit of FIG. 3A. Because additional clock edges 350 are generated in the system clock signal 154, the extra edges 350 cause the divided clock signal 358 to transition earlier at timing 352 due to the additionally generated edges 350 in the system clock signal 154. As a result, the divided clock signals 354 and 358 become deskewed at timing 356.

Figure 3C:
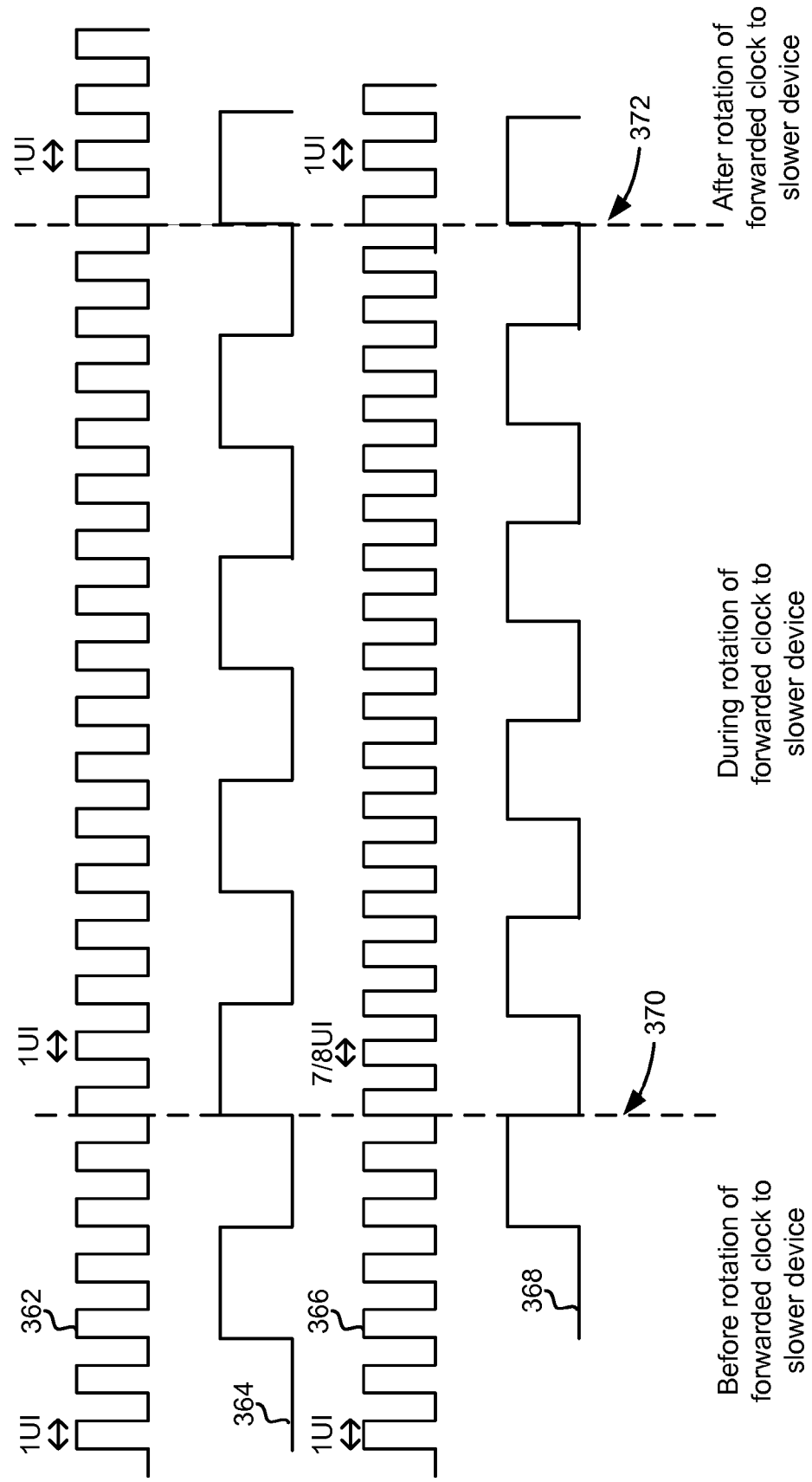
FIG. 3C is a timing diagram illustrating how a clock signal forwarded to the slower memory device is advanced by advancing the phase of that clock signal gradually relative to the other clock signal forwarded to the faster memory device, according to one embodiment.

FIG. 3C is a timing diagram illustrating how a system clock signal forwarded to the slower memory device is advanced by advancing the phase of that system clock signal gradually relative to the other system clock signal forwarded to the faster memory device, according to one embodiment. By way of illustration, clock signal 362 may be the system clock signal to be forwarded to the faster memory device 103, and clock signal 366 may be the system clock signal to be forwarded to the slower memory device 105. Clock signals 364, 368 are divided clock signals generated by dividing down the system clock signals 362, 366, respectively, by 4 UIs, in their respective memory devices 103, 105. As shown in FIG. 3C, before timing 370, divided clock signal 368 in the slower memory device 105 lags divided clock signal 364 in the faster memory device 103 in phase by 4 UIs due to difference in propagation delay of the system clock signals in the memory devices 103, 105. However, between timings 370, 372, the system clock signal 366 provided to the slower memory device 105 is gradually rotated by advancing its phase, for example, by ⅛ UI for every 1 UI of the regular clock phase of the system clock 366. In other words, the clock phase width of system clock signal 366 during the rotation period 370-372 is ⅞ UI. As a result, the system clock signal 366 is advanced during period 370-372 by 1 UI for every 8 UIs, and the divided clock signal 368 is also gradually rotated during the rotation period 370-372 by 1 UI for every 8 UIs. At timing 372 the phase of divided clock signal 368 becomes in synchronization with the phase of divided clock signal 364, thereby allowing the slower memory device 105 to transmit the read data back to the memory controller 101 deskewed from the data read from the faster memory device 103. Although the example of FIG. 3C shows gradually advancing the phase of system clock signal 366 by 1 UI for every 8 UIs, in practice the system clock signal 366 may be even more gradually advanced, for example, by 1 UI for every 64 UIs.

The levelization method according to the embodiments herein does not add complicated extra hardware, extra power, extra latency, or additional timing paths to the memory systems. The slower memory device is made to operate sooner by advancing its state machines earlier than the faster memory device in order to compensate for the added delay in propagating the system clock signal in the slower memory device. The levelization method herein may be used with a variety of memory system architectures, such as multi-stacked PoP (Package on Package), TSV (Through-Silicon Via), clamshell SO-DIMM (Small-Outline Dual In-line Memory Module, short channel chip-to-chip. Furthermore, the levelization method according to the various embodiments herein may be used with a multi-rank memory interface with multi-drop CA/DQ architecture with the system clock forwarded per memory device by placing the clock rotator on the memory devices, for example, as shown in the embodiment of FIG. 1B. In addition, for a homogeneous memory stack with TSV, the per-device forwarded system clock can be implemented by sending N clock signals to all N stacks of the memory stack, with each memory device on each stack having a N:1 multiplexer to select a unique forwarded system clock signal based on its unique ID associated with the stack number.

Upon reading this disclosure, those of ordinary skill in the art will appreciate still alternative structural and functional designs for deskewing the interface between a memory controller and multiple memory devices, through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure herein without departing from the spirit and scope of the disclosure as defined in the appended claims.

What is claimed is:

1. In a memory controller for controlling a plurality of memory devices including at least a first memory device and a second memory device, respectively, a method comprising:

determining a skew between timings when first data and second data are received from the first memory device and the second memory device, respectively, the first data read from the first memory device according to a first clock signal forwarded from the memory controller via a first communication channel and the second data read from the second memory device according to a second clock signal forwarded from the memory controller via a second communication channel; and generating, by the memory controller, an advanced first clock signal that is advanced relative to the second clock signal by a phase corresponding to the determined skew, the advanced first clock signal generated based on the determined skew;

transmitting, by the memory controller, the advanced first clock signal to the first memory device and the second clock signal to the second memory device; and simultaneously receiving third data from the first memory device and fourth data from the second memory device;

wherein the first memory device and the second memory device simultaneously read the third data and the fourth data from the first memory device and the second memory device, respectively, according to the advanced first clock signal and the second clock signal, respectively, and the reading of the third data and the fourth data is distinct from the first memory device and the second memory device simultaneously transmitting the third data and the fourth data to the memory controller.

2. The method of claim 1, wherein the skew is determined as a number of unit intervals between the timings at which the first data and the second data are received at the memory controller.

3. The method of claim 1, wherein generating the advanced first clock signal comprises generating additional edges in the first clock signal corresponding to the determined skew while pausing the first clock signal and the second clock signal.

4. The method of claim 1, wherein generating the advanced first clock signal comprises gradually advancing the phase of the first clock signal relative to the second clock signal.

5. A memory controller for controlling a plurality of memory devices including at least a first memory device and a second memory device, the memory controller comprising:

a first interface circuit configured to forward a first clock signal to the first memory device and receive first data read from the first memory device according to the forwarded first clock signal via a first communication channel;

a second interface circuit configured to forward a second clock signal to the second memory device and receive second data read from the second memory device according to the forwarded second clock signal via a second communication channel; and a controller circuit configured to cause the first interface circuit to generate an advanced first clock signal that is advanced relative to the second clock signal by a phase corresponding to a skew between timings when the first data and the second data are received by the first interface circuit and the second interface circuit, respectively;

wherein the first circuit interface is further configured to transmit the advanced first clock signal to the first memory device and wherein the second circuit interface is further configured to transmit the second clock signal to the second memory device;

wherein the first circuit interface and the second circuit interface are further configured to simultaneously receive third data from the first memory device and fourth data from the second memory device;

wherein the first memory device and the second memory device simultaneously read the third data and the fourth data from the first memory device and the second memory device, respectively, according to the advanced first clock signal and the second clock signal, respectively, and the reading of the third data and the fourth data is distinct from the first memory device and the second memory device simultaneously transmitting the third data and the fourth data to the first circuit interface and the second circuit interface of the memory controller.

6. The memory controller of claim 5, wherein the controller circuit is configured to determine the skew between the first data and the second data.

7. The memory controller of claim 6, wherein the skew is determined as a number of unit intervals between the timings at which the first data and the second data are received.

8. The memory controller of claim 5, wherein the controller circuit is configured to cause the first interface circuit to generate the advanced first clock signal by generating additional edges in the first clock signal corresponding to the skew while pausing the first clock signal and the second clock signal.

9. The memory controller of claim 5, wherein the controller circuit is configured to cause the first interface circuit to generate the advanced first clock signal by gradually advancing the phase of the first clock signal relative to the second clock signal.

10. In a memory controller for controlling a plurality of memory devices including at least a first memory device and a second memory device, a method comprising:

determining a skew between timings when first data and second data are received from the first memory device and the second memory device, respectively, the first data read from a first memory core of the first memory device according to a first clock signal forwarded from the memory controller via a first communication channel and the second data read from a second memory core from the second memory device according to a second clock signal forwarded from the memory controller via a second communication channel; and transmitting a command to the first memory device, the command indicating to the first memory device that the first clock signal be advanced by the first memory device relative to the second clock signal by a phase corresponding to the determined skew;

wherein third data is read from the first memory core of the first memory device simultaneously with fourth data read from the second memory core of the second memory device according to the advanced first clock signal and the second clock signal respectively, and the third data and fourth data are simultaneously transmitted to the memory controller according to the advanced first clock signal and the second clock signal, respectively;

wherein the simultaneous reading of the third data and the fourth data from the first memory core of the first memory device and the second memory core of the second memory device is distinct from the simultaneous transmission of the third data and the fourth data to the memory controller.

11. The method of claim 10, wherein the skew is determined as a number of unit intervals between the timings at which the first data and the second data are received at the memory controller.

12. The method of claim 10, wherein the command is to generate additional edges in the first clock signal corresponding to the determined skew while pausing the first clock signal and the second clock signal.

13. The method of claim 10, wherein the command is to gradually advance the phase of the first clock signal relative to the second clock signal.

14. A memory controller for controlling a plurality of memory devices including at least a first memory device and a second memory device, the memory controller comprising:

a first interface circuit configured to forward a first clock signal to the first memory device and receive first data read from a first memory core of the first memory device according to the forwarded first clock signal via a first communication channel;

a second interface circuit configured to forward a second clock signal to the second memory device and receive second data read from a second memory core of the second memory device according to the forwarded second clock signal via a second communication channel; and a controller circuit configured to transmit a command to the first memory device, the command indicating to the first memory device that the first clock signal be advanced by the first memory device relative to the second clock signal by a phase corresponding to a skew between timings when the first data and the second data are received by the first interface circuit and the second interface circuit, respectively;

wherein the first memory device and the second memory device simultaneously read and output third data and fourth data, respectively, the third data read by the first memory device from the first memory core and output to the memory controller according to the advanced first clock signal and the fourth data read by the second memory device from the second memory core and output to the memory controller according to the second clock signal;

wherein the simultaneous reading of the third data and the fourth data from the first memory core of the first memory device and the second memory core of the second memory device is distinct from the simultaneous outputting of the third data and the fourth data to the memory controller.

15. The memory controller of claim 14, wherein the controller circuit is configured to determine the skew between the first data and the second data.

16. The memory controller of claim 15, wherein the skew is determined as a number of unit intervals between the timings at which the first data and the second data are received.

17. The memory controller of claim 14, wherein the command is to generate additional edges in the first clock signal corresponding to the skew while pausing the first clock signal and the second clock signal.

18. The memory controller of claim 14, wherein the command is to gradually advance the phase of the first clock signal to the second clock signal.

19. In a memory controller for controlling a plurality of memory devices including at least a first memory device and a second memory device, a method comprising:
generating, by the memory controller, a first clock signal and a second clock signal, the first clock signal advanced in phase relative to the second clock signal;
forwarding, by the memory controller, the advanced first clock signal and the second clock signal to the first memory device and the second memory device, respectively; and
receiving first data read from the first memory device according to the advanced first clock signal via a first communication channel and second data read from the second memory device according to the second clock signal via a second communication channel, the first data and the second data received at the memory controller unskewed;
wherein the first memory device and the second memory device simultaneously read the first data and the second data from the first memory device and the second memory device, respectively, according to the advanced first clock signal and the second clock signal, respectively, and the reading of the first data and the second data is distinct from the first memory device and the second memory device simultaneously transmitting the first data and the second data to the memory controller.

20. The method of claim 19, wherein generating the advanced first clock signal comprises generating additional edges in the first clock signal while pausing the first clock signal and the second clock signal.

21. The method of claim 19, wherein generating the advanced first clock signal comprises gradually advancing the phase of the first clock signal relative to the second clock signal.

22. A memory controller for controlling a plurality of memory devices including at least a first memory device and a second memory device, the memory controller comprising:
a controller circuit configured to generate a first clock signal and a second clock signal, the first clock signal advanced in phase relative to the second clock signal;
a first interface circuit configured to forward the advanced first clock signal to the first memory device and receive first data read from the first memory device according to the advanced first clock signal via a first communication channel; and
a second interface circuit configured to forward the second clock signal to the second memory device and receive second data read from the second memory device according to the second clock signal via a second communication channel, and wherein:
the first interface circuit and the second interface circuit receive the first data and the second data, respectively, unskewed;
the first memory device and the second memory device simultaneously read the first data and the second data from the first memory device and the second memory device, respectively, according to the advanced first clock signal and the second clock signal, respectively, and the reading of the first data and the second data is distinct from the first memory device and the second memory device simultaneously transmitting the first data and the second data to the first interface and the second interface of the memory controller.

23. The memory controller of claim 22, wherein the advanced first clock signal is generated by generating additional edges in the first clock signal while pausing the first clock signal and the second clock signal.

24. The memory controller of claim 22, wherein the advanced first clock signal is generated by gradually advancing the phase of the first clock signal relative to the second clock signal.

25. In a memory controller for controlling a plurality of memory devices including at least a first memory device and a second memory device, a method comprising:
forwarding a first clock signal and a second clock signal to the first memory device and the second memory device, respectively, the first clock signal being in phase with the second clock signal;
transmitting a command to the first memory device indicating to the first memory device that the first clock signal be advanced by the first memory device relative to the second clock signal by a phase; and
receiving first data read from a first memory core of the first memory device according to the advanced, forwarded first clock signal via a first communication channel and second data read from a second memory core of the second memory device according to the forwarded second clock signal via a second communication channel, the first data and the second data received at the memory controller unskewed, wherein the first data is read from the first memory core of the first memory device simultaneously with the second data read from the second memory core of the second memory device according to the advanced, forwarded first clock signal and the forwarded second clock signal respectively, and the first data and the second data are simultaneously transmitted to the memory controller according to the advanced, forwarded first clock signal and the forwarded second clock signal, respectively;
wherein the simultaneous reading of the first data and the second data from the first memory core of the first memory device and the second memory core of the second memory device is distinct from the simultaneous transmission of the first data and the second data to the memory controller.

26. A memory controller for controlling a plurality of memory devices including at least a first memory device and a second memory device, the memory controller comprising:
a first interface circuit configured to forward a first clock signal to the first memory device and receive first data read from a first memory core of the first memory device according to the forwarded first clock signal via a first communication channel;
a second interface circuit configured to forward a second clock signal to the second memory device and receive second data read from a second memory core of the second memory device according to the forwarded second clock signal via a second communication channel; and
a controller circuit configured to generate a command indicating to the first memory device that the first clock signal be advanced by the first memory device relative to the second clock signal by a phase, the first interface circuit further configured to transmit the command to the first memory device, and wherein the first interface circuit and the second interface circuit receive the first data and the second data, respectively, unskewed;

wherein the first memory device and the second memory device simultaneously read and output the first data and the second data, respectively, the first data read by the first memory device from the first memory core and output to the memory controller according to the advanced first clock signal and the second data read by the second memory device from the second memory core and output to the memory controller according to the second clock signal;

wherein the simultaneous reading of the first data and the second data from the first memory core of the first memory device and the second memory core of the second memory device is distinct from the simultaneous output of the first data and the second data to the memory controller.

27. In a memory module including at least a first memory device and a second memory device controlled by a memory controller, a method comprising:

receiving a first clock signal forwarded from the memory controller at the first memory device;

receiving a second clock signal forwarded from the memory controller at the second memory device, the first clock signal being advanced in phase relative to the second clock signal and the advanced first clock signal generated by the memory controller;

simultaneously reading first data from the first memory device and second data from the second memory device according to the advanced first clock signal and the second clock signal, respectively;

transmitting the first data read from the first memory device according to the advanced first clock signal via a first communication channel; and transmitting the second data read from the second memory device according to the second clock signal via a second communication channel, and wherein the first data and the second data are simultaneously transmitted to the memory controller unskewed;

wherein the simultaneously reading of the first data and the second data from the first memory device and the second memory device is distinct from the simultaneous transmission of the first data and the second data to the memory controller.

28. In a memory module including at least a first memory device and a second memory device controlled by a memory controller, a method comprising:

receiving a first clock signal forwarded from the memory controller at the first memory device;

receiving a second clock signal forwarded from the memory controller at the second memory device, the first clock signal being in phase with the second clock signal;

receiving at the first memory device a command indicating that the first clock signal be advanced by the first memory device relative to the second clock signal by a phase;

transmitting first data read from a first memory core of the first memory device according to the advanced, forwarded first clock signal via a first communication channel; and transmitting second data read from a second memory core the second memory device according to the forwarded second clock signal via a second communication channel, and wherein the first data and the second data are simultaneously transmitted to the memory controller unskewed; and wherein the first data is read from the first memory core of the first memory device simultaneously with the second data read from the second memory core of the second memory device according to the advanced forwarded first clock signal and the forwarded second clock signal respectively, and the first data and the second data are simultaneously transmitted to the memory controller according to the advanced forwarded first clock signal and the forwarded second clock signal, respectively;

wherein the simultaneous reading of the first data and the second data from the first memory core of the first memory device and the second memory core of the second memory device is distinct from the simultaneous transmission of the first data and the second data to the memory controller.

* * * * *